(12) United States Patent
Matsuda

(10) Patent No.: US 6,454,843 B2
(45) Date of Patent: Sep. 24, 2002

(54) INK FOR STENCIL PRINTING

(75) Inventor: Hiroshi Matsuda, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 58 days.

(21) Appl. No.: 09/749,429

(22) Filed: Dec. 28, 2000

(30) Foreign Application Priority Data

Dec. 28, 1999 (JP) .............................................. 11-373676

(51) Int. Cl.$^7$ ................................................ C09D 11/00
(52) U.S. Cl. .................. 106/31.43; 106/31.75; 106/31.25; 106/31.26
(58) Field of Search ................ 106/31.43, 31.75, 106/31.25, 31.26

(56) References Cited

U.S. PATENT DOCUMENTS 5,573,578 A * 11/1996 Okuda ...................... 106/31.26
5,948,151 A * 9/1999 Ono et al. ................ 106/31.26
6,190,444 B1 * 2/2001 Okuda et al. ............. 106/31.26

FOREIGN PATENT DOCUMENTS

JP 54-23601 B2 8/1979
JP 06-033007 A 2/1994

* cited by examiner

Primary Examiner—Helene Klemanski
(74) Attorney, Agent, or Firm—Nixon Peabody LLP; Donald R. Studebaker

(57) ABSTRACT

A stencil printing ink contains a polyamino-amide dispersant and a smectite.

4 Claims, 1 Drawing Sheet

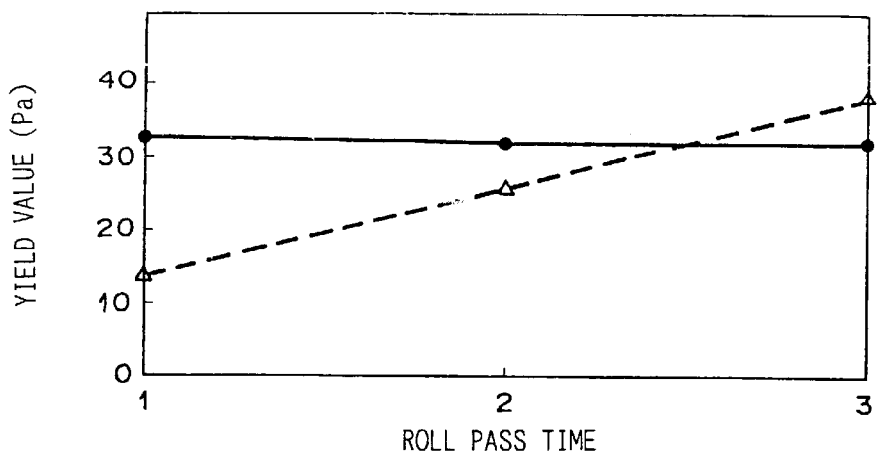
F I G. 1
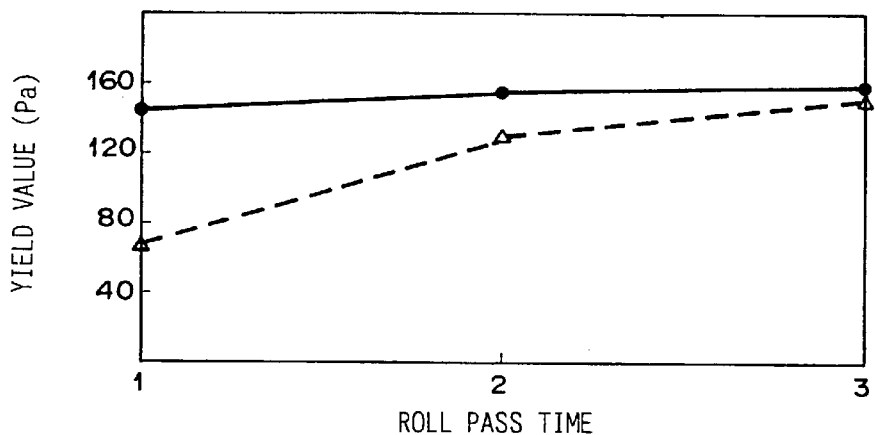
F I G. 2
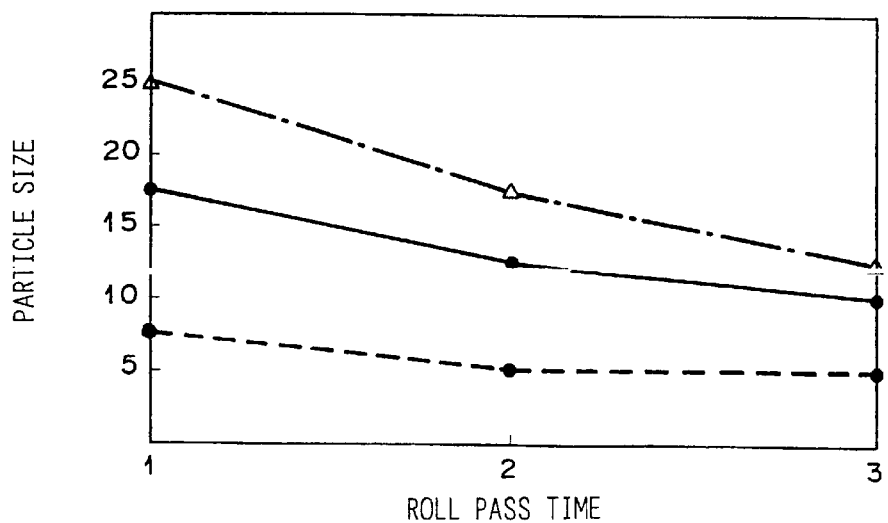
F I G. 3

INK FOR STENCIL PRINTING

BACKGROUND OF THE INVENTION

1. Field of the Invention

This invention relates to ink for stencil printing, and more particularly to a stencil printing ink containing therein smectite.

2. Description of the Related Art

The stencil printing is a method of printing in which printing is made on paper or the like by transferring ink from one side of a stencil to the other side through imagewise perforations in the stencil.

It is generally preferred that the stencil printing ink can readily permeate the stencil and has moderate flowability as well as that it is excellent in leveling after printing and can dry soon after printing. Especially in the case of the ink for the stencil printing where the drum is of an open type, it is necessary that the ink has moderate hardness to prevent sag of the ink and at the same time the ink has moderate softness in order to promote penetration into the printing material. Accordingly, it is very important to adjust the flowability of the ink.

In order to adjust the flowability of the ink, a flow control agent has been often added to the ink. For example, for the stencil printing ink, smectite group clay minerals such as bentonite, hectorite, heide llite, saponite and the like containing montmorillonite as a main component have been often employed. For example, in Japanese Patent Publication No. 54(1979)-23601, there is disclosed stencil printing ink in which a thickening agent such as organic bentonite is added to stencil printing emulsion ink composition to increase effective hardness of the ink and improve finish of printing. In Japanese Unexamined Patent Publication No. 6(1994)-33007, there is disclosed emulsion ink which contains montmorillonite clathrated surfactant.

The flow control effect of the smectite is considered to be governed by the particle size of the smectite in the ink vehicle and the degree of dispersion of the smectite in the vehicle (which depends upon the particle size) in addition to the quality of the smectite itself. Accordingly, in order to obtain ink having desired flow characteristics, it is necessary to control not only the quality of the smectite but also the particle size and the degree of dispersion of the smectite.

However, though the quality of the smectite has been studied, the particle size of the smectite has been hardly studied. Further, since the smectite absorbs water to disintegrate and swell when introduced into water, there has not been established a means for controlling dispersion of the smectite.

Further, it has been conceived that the flow control effect of the smectite owes to the phenomenon that a gel structure is formed by hydrogen bonding of the ends of hydroxyl groups on a side of a leaf of the smectite and the leafs are cross-linked by molecules of water. Accordingly, it is conceived that if the conventional smectite addition technique for stencil printing emulsion ink is simply applied to stencil printing oil ink containing no water such as UV ink, the flowability of the ink cannot be stabilized.

SUMMARY OF THE INVENTION

In view of the foregoing observations and description, the primary object of the present invention is to provide a stencil printing ink containing therein a dispersant which can be applied to both stencil printing emulsion ink and stencil printing oil ink to stably disperse smectite in an improved manner.

The stencil printing ink of the present invention is characterized by containing therein a polyamino-amide dispersant and a smectite.

In this specification, the term "smectite" should be broadly interpreted not to mean a particular kind of smectite but to mean various natural or synthetic clay minerals such as bentonite, hectorite, heide llite, saponite and the like which contain montmorillonite as a main component and have been used as a flow control agent to be contained in known stencil printing inks.

The term "polyamino-amide dispersant" means a dispersant containing therein a polyamino-amide compound. For example, the "polyamino-amide dispersant" may be a polyamino-amide compound itself, or a polyamino-amide compound dissolved in solvent. In this specification, the term "a polyamino-amide compound" should be broadly interpreted to include various compounds of polyamino-amide such as carboxylates of polyamino-amide, salts of polyamino-amide and esters, and the like.

The term "stencil printing ink" means ink for use in stencil printing and should be broadly interpreted to include both emulsion inks for the stencil printing and oil inks for the stencil printing. When the stencil printing ink is an emulsion ink, it is preferred that the polyamino-amide dispersant comprises a polycarboxylate of polyamino-amide, and when the stencil printing ink is an oil ink, it is preferred that the polyamino-amide dispersant comprises a salt of long-chain polyamino-amide and polar acid ester.

It is preferred that the polyamino-amide dispersant be contained in the ink in such an amount that makes the polyamino-amide compound content in the ink 0.05 to 5% by weight of the total weight of the ink, more preferably 0.1 to 3% by weight and most preferably 0.5 to 1.5% by weight.

The polyamino-amide content of the polyamino-amide dispersant is preferably 0.05 to 5% by weight of the total weight of the ink, more preferably 0.1 to 3% by weight and most preferably 0.5 to 1.5% by weight.

In the stencil printing ink in accordance with the present invention, by virtue of the polyamino-amide dispersant contained therein, particles of the smectite can be perfectly dispersed and stable flow control effect can be obtained. It is conceived that this is because the carboxyl group of the polyamino-amide and the smectite causes selective electrostatic chemisorption during wetting and a gel structure is formed, whereby the particle size of the smectite in the ink vehicle is made proper, and dispersion of the smectite particles in the ink vehicle is improved and stabilized.

When the particle size of the smectite in the ink vehicle is thus made proper, and dispersion of the smectite particles in the ink vehicle is thus improved and stabilized, the flow control effect by the smectite is enhanced, and a desired yield value of the ink (a minimum shearing force required to cause flow of the ink, or the degree to which the ink keeps its shape) can be obtained from the beginning without passing the ink composition through the roll mill increased times. (The times at which the ink composition is passed through the roll mill before a desired yield value is obtained will be referred to as the "roll pass time", hereinbelow.) That is, in the conventional ink without polyamino-amide dispersant, a sufficient flow control effect of the smectite cannot be obtained and accordingly, the yield value tends to be proportional to the roll pass time, that is, as the roll pass time is smaller, the yield value is lower and as the roll pass time is larger, the yield value is higher. To the contrast, in the stencil printing ink of the present invention, the dispersion of the smectite is improved and stabilized by virtue of the polyamino-amide dispersant, the yield value of the ink hardly depends upon the roll pass time and a desired yield value can be obtained at a smaller roll pass time.

Further, when the dispersion of the smectite is improved, the dispersion of other ink components such as coloring agents, especially phthalocyanine pigments which have been said to be very difficult to disperse, can be improved, whereby the quality of the ink can be improved.

Further, since sufficient dispersion can be obtained even if the roll pass time is one, the dispersion time can be shortened and the productivity of the stencil printing ink can be improved.

When the polyamino-amide compound content of the polyamino-amide dispersant is in the range of 0.05% to 5% by weight of the total weight of the ink, the particle size of the smectite in the ink vehicle is made further proper, and dispersion of the smectite particles in the ink vehicle is further improved and stabilized.

BRIEF DESCRIPTION OF THE DRAWINGS

FIG. 1 is a graph showing the relation between the mean yield value of the oil phases of the emulsion inks of the first to sixth embodiments and the roll pass time together with the relation between the mean yield value of the oil phases of the emulsion inks of the first to fourth comparative examples and the roll pass time, FIG. 2 is a graph showing the relation between the mean yield value of the oil inks of the seventh and eighth embodiments and the roll pass time together with the relation between the mean yield value of the oil inks of the fifth and sixth comparative examples and the roll pass time, and FIG. 3 is a graph showing the relation between the particle size and the roll pass time in the inks containing therein copper phthalocyanine.

DETAILED DESCRIPTION OF THE INVENTION

Stencil printing emulsion inks and stencil printing oil inks in accordance with embodiments of the present invention will be described in detail, hereinbelow.

It is preferred that the oil phase of the stencil printing emulsion ink contains, in addition to the dispersant and the flow control agent, resin, solvent, an emulsifier, a coloring agent and the like.

As the polyamino-amide dispersant, polycarboxylates of polyamino-amide dissolved in hydrocarbon solvent, and salts of long-chain polyamino-amide and polar acid ester dissolved in hydrocarbon solvent are preferred. For example, Anti-Terra-204 (containing therein polycarboxylate of polyamino-amide in 52%) and Disperbyk-101 (containing therein salt of long-chain polyamino-amide and polar acid ester in 51%) which are commercially available from BYK Chemie .Japan are preferably employed.

The smectite as a flow control agent is represented by a general formula

$(X, Y)_{2.3}Z_4O_{10}(OH)_2 \cdot mH_2O \cdot (W\omega)$ wherein X represents Al, $Fe^{III}$, $Mn^{III}$ or $Cr^{III}$, Y represents Mg, $Fe^{II}$, $Mn^{II}$, Ni, Zn or Li, Z represents Si or Al, and W represents K, Na or Ca, $H_2O$ being interlayer water and ω (=⅓) representing the average of the amount of the alkali metal (represented by W) replaced by base. The smectite as employed in this invention need not be special but may be natural, synthesized or chemically modified. For example, the smectite may be bentonite containing montmorillonite as a main component, magnesium bentonite obtained by replacing part of montmorillonite by Mg, calcium bentonite obtained by replacing part of montmorillonite by Ca, hectorite, heide llite, saponite or organic modified clay minerals obtained by modifying the clay minerals listed above with a quaternary ammonium salt cationic surface active agent, e.g., dimethyl alkyl ammonium hectorite, benzyldimethyl stearyl ammonium hectorite, distearyldimethyl ammonium chloride-processed aluminum magnesium silicate, and distearyldimethyl ammonium chloride-processed montmorillonite.

As the resin, polyamide resin, urethane resin, alkyd-modified phenol resin, rosin ester resin, rosin-modified alkyd resin, rosin-modified phenol resin, alkyd resin, petroleum resin, compounds of fats and oils, modified compounds of fats and oils, gilsonite, polybutadiene, polybutadiene hydride, acrylic resin, melamine resin, urea resin, phenol resin, polyester resin, silicone resin, epoxy resin, cellulose resin, and the like may be suitably used. The resin in the oil phase improves dispersion of the coloring agents and fixes the coloring agents to the printing paper. The iodine value of the resin need not be limited. However, if the iodine value of the resin exceeds 100, the stencil printing ink dries and solidifies too fast, which can result in clogging. From the viewpoint of stability of the ink, it is preferred that the iodine value of the resin be not larger than 100.

Any solvent which has been known as solvent for the stencil printing ink can be employed irrespective of whether it is volatile or non-volatile. As the non-volatile solvents, mineral oil solvents such as motor oil, spindle oil, machine oil, liquid paraffin, aroma-free solvents or the like or vegetable oil such as olive oil, soybean oil, coconut oil, tall oil, castor oil, dehydrated castor oil, safflower oil or the like can be employed. As the volatile solvents, aromatic hydrocarbon solvents, aliphatic hydrocarbon solvents, mixtures of aromatic hydrocarbon solvent and aliphatic hydrocarbon solvent, paraffin hydrocarbon solvents, isoparaffin hydrocarbon solvents, naphthenic hydrocarbon solvents or the like can be employed. Since the stencil printing is used wide by general users such as schools and public agencies, aliphatic hydrocarbon solvents are preferred among these solvents from the viewpoint of safety and/or sanitation.

The solvents may be used either alone or in a mixture. As a mixture of the solvents, a mixture of spindle oil and an aliphatic hydrocarbon solvent, a mixture of spindle oil, an aliphatic hydrocarbon solvent and castor oil, and the like can be employed. When a mixture of a non-volatile solvent and a volatile solvent is used, the ratio of the former to the latter (non-volatile solvent/volatile solvent) is preferably in the range of 50 to 95% by weight/50 to 5% by weight though depending upon the oil phase/water phase ratio in the emulsion ink.

As the emulsifier, nonionic surface active agents such as high fatty acid esters of sorbitan, e.g., sorbitan monolaurate, sorbitan monopalmitate, sorbitan monostearate, sorbitan tristearate, sorbitan monooleate, sorbitan sesquioleate and the like; fatty acid monoglyceride; fatty acid diglyceride and ethylene oxide addition products of higher alcohols, alkyl phenols, fatty acids and the like.

As the coloring agent, known pigments and dyes of various colors may be employed. As the pigment, organic pigments such as azo-pigments, phthalocyanine pigments, dye pigments, condensation polycyclic pigments, nitro-pigments, nitroso pigments, and the like (e.g., brilliant carmine 6B, lake red C, Watching red, diazo yellow, Hansa yellow, phthalocyanine blue, phthalocyanine green, alkali blue, aniline black), inorganic pigments such as metals (e.g., cobalt, iron, chrome, copper, zinc, lead, titanium, vanadium, manganese, nickel), metal oxides, metal sulfides, carbon blacks (e.g., furnace black, lamp black, channel black), yellow ocher, ultramarine, iron blue pigments and the like can be employed.

Extending pigments may be contained in the oil phase and/or the water phase. Any known extending pigment may be used so long as it is in the form of water-insoluble fine particles. For example, inorganic particles of china clay, talc, clay, diatomaceous earth, calcium carbide, barium sulfate, titanium oxide, alumina white, silica, kaolin, mica and aluminum hydroxide and organic particles of polyacrylate, polyurethane, polyester, polyethylene, polypropylene, polyvinyl chloride, polyvinylidene chloride, polystyrene, polysiloxane, phenol resin, epoxy resin, benzoguanamine resin and copolymers thereof can be employed.

The water phase components of the stencil printing emulsion ink of the present invention may include water, electrolytes, evaporation retardants, water-soluble high polymers, preservatives, mildew proofing agents, antioxidants, pH adjustors and the like. When the oil phase contains no coloring agent, the water phase may contain a coloring agent such as those described above in conjunction with the coloring agents which may be contained in the oil phase.

The stencil printing oil ink of the present invention contains resin, solvent, a coloring agent, antioxidants and the like which may be the same as those employed in the oil phase of the stencil printing emulsion ink. Further, ultraviolet ray curing ink may be formed by adding ultraviolet ray curing resin (monomer, oligomer or the like), polymerization initiator and the like to the ink composition. In this case, polyol acrylate (e.g., polypropylene glycol diacrylate, dipentaerythritol pentaacrylate, and dipentaerythritol hexaacrylate), polyester acrylate (e.g., diacrylate of polyester diol of tetrahydrophthalic acid (anhydride) and diethylene glycol), epoxy acrylate (e.g., bisphenol A epoxy acrylate), and phenol EO-modified acrylate are preferred.

This invention will be described in more detail with reference to embodiments.

EMBODIMENT 1

1 part by weight of bentonite clay mineral (SBen (HOJYUN YOKO): the chemical composition by EDX analysis was as follows in % by weight, $SiO_2$:64.1, $Fe_2O_3$:15.6, $Al_2O_3$:14.9, $SO_3$:3.4, $CaO$:1.2, $TiO_2$:0.7, $ZrO_2$:0.04, $SrO$:0.039), 15 parts by weight of alkyd resin (Harima Chemicals, inc.), 6 parts by weight of carbon black MA-100 (Mitsubishi Chemical corporation) as a coloring agent, 10.5 parts by weight of No. 5 solvent AF-5 (Nisseki Mitsubishi) as solvent, 2 parts by weight of hexaglycerine 5 oleate (HG-50 ; Nikko Chemicals Co, LTD) as emulsifier, and 0.5 parts by weight of Anti-Terra-204 (BYK Chemie.Japan) as polycarboxylate of polyamino-amide were mixed well and dispersed by a triple roll mill, thereby obtaining an oil phase. Then 65 parts by weight of ion-exchange water as a water phase was added to the oil phase while stirring to emulsify the mixture, whereby stencil printing W/O emulsion ink of a first embodiment of the present invention was obtained.

EMBODIMENT 2

Stencil printing W/O emulsion ink of a second embodiment was obtained in the same manner as the first embodiment except that the composition of the oil phase was as shown in the following table 1 and decaglycerine 6 oleate (DG-60; Nikko Chemicals CO,LTD) was used as emulsifier.

EMBODIMENT 3

Stencil printing W/O emulsion ink of a third embodiment was obtained in the same manner as the first embodiment except that the composition of the oil phase was as shown in the following table 1 and hexaglycerine PR15 (HG-PR-15; Nikko Chemicals Co,LTD) was used as emulsifier.

EMBODIMENT 4

Stencil printing W/O emulsion ink of a fourth embodiment was obtained in the same manner as the first embodiment except that the composition of the oil phase was as shown in the following table 1.

EMBODIMENT 5

Stencil printing W/O emulsion ink of a fifth embodiment was obtained in the same manner as the first embodiment except that the composition of the oil phase was as shown in the following table 1 and copper phthalocyanine (Dainihon Ink inc. ) was used as a coloring agent.

EMBODIMENT 6

Stencil printing W/O emulsion ink of a sixth embodiment was obtained in the same manner as the fifth embodiment except that the composition of the oil phase was as shown in the following table 1 and decaglycerine 6 oleate (DG-60; Nikko Chemicals Co,LTD) was used as emulsifier.

EMBODIMENT 7

8 parts by weight of hectorite clay mineral (Bentone #38 (RHEOX Company): the chemical composition by EDX analysis was as follows in % by weight, $SiO_2$:65.4, $Fe_2O_3$:15.3, $Al_2O_3$:14.2, $SO_3$:3.8, $CaO$:0.5, $TiO_2$:0.6, $ZrO_2$:0.05), 5 parts by weight of carbon black MA-100 (Mitsubishi Chemical corporation) as a coloring agent, 32.4 parts by weight of ARONIX M-102 (resin: Toagosei Co., LTD), 30 parts by weight of ARONIX M-400 (resin: Toagosei Co., LTD), 20 parts by weight of BANBEAM UV-103 (resin: Harima Chemicals Inc.,), 3 parts by weight of polymerization initiator Irg-369 (CIBA SPECIALTY CHEMICALS), 0.5 parts by weight of KAYACURE DETX (NIPPON KAYAKU CO, LTD), 0.1 parts by weight of polymerization inhibitor Q-1301 (Wako Jun-yaku), and 1 part by weight of Disperbyk-101 (salt of long-chain polyamino-amide and polar acid ester: BYK Chemie.Japan) were mixed well and dispersed by a triple roll mill, thereby obtaining stencil printing oil ink of a seventh embodiment of the present invention.

EMBODIMENT 8

Stencil printing oil ink of an eighth embodiment was obtained in the same manner as the seventh embodiment except that the composition was as shown in the following table 1 and copper phthalocyanine (Dainihon Ink inc.) was used as a coloring agent.

TABLE 1

| | | unit: parts by weight | emb. 1 | emb. 2 | emb. 3 | emb. 4 | emb. 5 | emb. 6 | emb. 7 | emb. 8 |
|---|---|---|---|---|---|---|---|---|---|---|
| oil phase | coloring agent | carbon black | 6.0 | 6.0 | 6.0 | 6.0 | | | 5.0 | |
| | | copper phthalocyanine | | | | | 6.0 | 6.0 | | 6.00 |
| | emulsifier | HG-50 | 2.0 | | | 2.0 | 2.0 | | | |
| | | DG-60 | | 2.0 | | | | 2.0 | | |
| | | HG-PR-15 | | | 2.0 | | | | | |
| | dispersant | Anti-Terra-204 | 0.5 | 1.0 | 0.5 | 1.0 | 1.0 | 1.0 | | |

TABLE 1-continued

| | unit: parts by weight | | emb. 1 | emb. 2 | emb. 3 | emb. 4 | emb. 5 | emb. 6 | emb. 7 | emb. 8 |
|---|---|---|---|---|---|---|---|---|---|---|
| | resin | Disperbyk-101 | | | | | | | 1.0 | 1.0 |
| | | alkyd resin | 15.0 | 10.0 | 15.0 | 10.0 | 15.0 | 15.0 | | |
| | | monomer M-102 | | | | | | | 32.4 | 31.4 |
| | | monomer M-400 | | | | | | | 30.0 | 20.0 |
| | | oligomer UV-103 | | | | | | | 20.0 | 20.0 |
| | solvent | AF5 | 10.5 | 14.0 | 10.5 | 14.0 | 10.0 | 10.0 | | |
| | smectite | SBen | 1.0 | 2.0 | 1.0 | 2.0 | 1.0 | 1.0 | | |
| | | Bentone #38 | | | | | | | 8.0 | 8.0 |
| | initiator | Irg369 | | | | | | | 3.0 | 3.0 |
| | | DETX | | | | | | | 0.5 | 0.5 |
| | inhibitor | Q-1301 | | | | | | | 0.1 | 0.1 |
| water phase | | | 65.0 | 65.0 | 65.0 | 65.0 | 65.0 | 65.0 | | |
| total | | | 100 | 100 | 100 | 100 | 100 | 100 | 100 | 100 |

COMPARATIVE EXAMPLE 1

Stencil printing W/O emulsion ink of a first comparative example was obtained in the same manner as the first embodiment except that the composition was as shown in the following table 2 and Anti-Terra-204 as polycarboxylate of polyamino-amide was not added.

COMPARATIVE EXAMPLE 2

Stencil printing W/O emulsion ink of a second comparative example was obtained in the same manner as the second embodiment except that the composition was as shown in the following table 2 and Anti-Terra-204 as polycarboxylate of polyamino-amide was not added.

COMPARATIVE EXAMPLE 3

Stencil printing W/O emulsion ink of a third comparative example was obtained in the same manner as the third embodiment except that the composition was as shown in the following table 2 and Anti-Terra-204 as polycarboxylate of polyamino-amide was not added.

COMPARATIVE EXAMPLE 4

Stencil printing W/O emulsion ink of a fourth comparative example was obtained in the same manner as the fifth embodiment except that the composition was as shown in the following table 2 and Anti-Terra-204 as polycarboxylate of polyamino-amide was not added.

COMPARATIVE EXAMPLE 5

Stencil printing oil ink of a fifth comparative example was obtained in the same manner as the seventh embodiment except that the composition was as shown in the following table 2 and Disperbyk-101 as salt of long-chain polyamino-amide and polar acid ester was not added.

COMPARATIVE EXAMPLE 6

Stencil printing oil ink of a sixth comparative example was obtained in the same manner as the eighth embodiment except that the composition was as shown in the following table 2 and Disperbyk-101 as salt of long-chain polyamino-amide and polar acid ester was not added.

TABLE 2

| | | unit: parts by weight | ex. 1 | ex. 2 | ex. 3 | ex. 4 | ex. 5 | ex. 6 |
|---|---|---|---|---|---|---|---|---|
| oil phase | coloring agent | carbon black | 6.0 | 6.0 | 6.0 | | 5.0 | |
| | | copper phthalocyanine | | | | 6.0 | | 6.0 |
| | emulsifier | HG-50 | 2.0 | | | 2.0 | | |
| | | DG-60 | | 2.0 | | | | |
| | | HG-PR-15 | | | 2.0 | | | |
| | dispersant | Anti-Terra-204 | | | | | | |
| | | Disperbyk-101 | | | | | | |
| | resin | alkyd resin | 15.0 | 10.0 | 15.0 | 10.0 | | |
| | | monomer M-102 | | | | | 33.4 | 32.4 |
| | | monomer M-400 | | | | | 30.0 | 30.0 |
| | | oligomer UV-103 | | | | | 20.0 | 20.0 |
| | solvent | AF5 | 10.5 | 15.0 | 10.5 | 15.0 | | |
| | smectite | SBen | 1.0 | 2.0 | 1.0 | 2.0 | | |
| | | Bentone #38 | | | | | 8.0 | 8.0 |
| | initiator | Irg369 | | | | | 3.0 | 3.0 |
| | | DETX | | | | | 0.5 | 0.5 |
| | inhibitor | Q-1301 | | | | | 0.1 | 0.1 |
| water phase | | | 65.0 | 65.0 | 65.0 | 65.0 | | |
| total | | | 99.5 | 100.0 | 99.5 | 100.0 | 100.0 | 100.0 |

Method of Evaluation of the Oil Phase of the Ink

The oil phases of the stencil printing emulsion inks of the first to sixth embodiments and the first to fourth comparative examples and the stencil printing oil inks of the seventh and eighth embodiments and the fifth and sixth comparative examples were passed through a triple roll mill (of a smaller type: INOUE SEISAKUSHO) each three times. Each time the oil phase or the oil ink was passed through the roll mill, the viscosity of the ink was measured through a flow curve at 23° C. by a cone plate type viscometer (HAAKE Corporation: stress control type), whereby a yield value of the ink after each dispersion was measured, and at the same time, the particle size after each dispersion was measured by the use of a grindmeter (YASUDA SEIKI: 25 μm at the largest). Further, seizing in the triple roll mill after the oil phase or the oil ink was once passed through the roll mill (a phenomenon that the smectite and/or the coloring agent was burnt on the surface of the rolls) was visually evaluated. When there was observed no seizing, the ink was marked with ○ in the following table 3, whereas when there was observed any seizing, the ink was marked with x in the following table 3 irrespective of the degree of seizing. The result of evaluation is shown in the following table 3 and FIGS. 1 to 3.

TABLE 3

|  | yield value (Pa) | | | particle size (μm) | | | seizing |
|---|---|---|---|---|---|---|---|
|  | 1st | 2nd | 3rd | 1st | 2nd | 3rd | 1st roll |
| emb. 1 | 30 | 28 | 30 | 12.5 | 10.0 | 7.5 | ○ |
| emb. 2 | 41 | 43 | 43 | 12.5 | 10.0 | 5.0 | ○ |
| emb. 3 | 28 | 26 | 25 | 15.0 | 10.0 | 7.5 | ○ |
| emb. 4 | 22 | 20 | 21 | 12.5 | 7.5 | 5.0 | ○ |
| emb. 5 | 40 | 38 | 38 | 17.5 | 12.5 | 10.0 | ○ |
| emb. 6 | 38 | 36 | 37 | 17.5 | 12.5 | 10.0 | ○ |
| emb. 7 | 140 | 158 | 160 | 10.0 | 5.0 | 5.0 | ○ |
| emb. 8 | 150 | 151 | 155 | 7.5 | 5.0 | 5.0 | ○ |
| ex. 1 | 10 | 15 | 35 | 22.5 | 17.5 | 10.0 | x |
| ex. 2 | 14 | 35 | 48 | 25.0 | 17.5 | 12.5 | x |
| ex. 3 | 12 | 22 | 32 | 22.5 | 15.0 | 10.0 | x |
| ex. 4 | 20 | 32 | 38 | 25.0 | 17.5 | 12.5 | x |
| ex. 5 | 65 | 120 | 144 | 22.5 | 15.0 | 10.0 | x |
| ex. 6 | 74 | 140 | 161 | 25.0 | 17.5 | 12.5 | x |

In FIG. 1, the solid line shows the relation between the mean yield value of the oil phases of the emulsion inks of the first to sixth embodiments and the roll pass time, and the broken line shows the relation between the mean yield value of the oil phases of the emulsion inks of the first to fourth comparative examples and the roll pass time. In FIG. 2, the solid line shows the relation between the mean yield value of the oil inks of the seventh and eighth embodiments and the roll pass time, and the broken line shows the relation between the mean yield value of the oil inks of the fifth and sixth comparative examples and the roll pass time. FIG. 3 shows the relation between the particle size and the roll pass time in the inks containing therein copper phthalocyanine as pigment. In FIG. 3, the solid line shows the mean particle size in the inks of the fifth and sixth embodiments, the broken line shows the mean particle size in the ink of the eighth embodiment, and the chained line shows the mean particle size in the inks of the fourth and sixth comparative examples.

As can be understood from table 3 and FIGS. 1 and 2, the yield values of the oil phases of the emulsion inks of the present invention and the oil inks of the present invention hardly depend upon the roll pass time, and a high yield value can be obtained by passing the ink through the roll mill only once. That is, the inks in accordance with the present invention are excellent in dispersion and the excellent dispersion is stable. As can be further understood from table 3 and FIG. 3, even the inks employing copper phthalocyanine pigment, which has been said to be bad in dispersion, can be substantially reduced in its particle size and improved in dispersion by only one roll pass time.

Method of Evaluation of the Stencil Printing Ink

Using the stencil printing W/O emulsion inks (or the oil inks) of the first to eighth embodiments and the first to sixth comparative examples (dispersed by passing through the triple roll mill only once), printing was made on RISO Printing Paper by a stencil printer, RISOGRAPH FR395 (RISO KAGAKU CORPORATION). In the case of the ultraviolet ray curing inks of the seventh and eighth embodiments and the fifth and sixth comparative examples, an ultraviolet ray projector was set on the printing paper discharge table of the printer and the printed paper was exposed to ultraviolet rays.

10000 copies were printed by use of each ink and the ink was evaluated by visually inspecting the 10000 copies. When the copies were free from loss of the image (that is, there was no clogging of the stencil), the ink was marked with ○ in the following table 4, whereas when the copies included loss of the image, the ink was marked with x in the following table 4. Further, the printing density of the solid part of the copies were measured by use of an OD meter (Macbeth RD920). After printing, the copies were allowed to stand at room temperature for one day, and then rubbed with a crockmeter. Thereafter, the copies were visually checked, and when almost no rubbing off was visually observed, the ink was marked with ○ in the following table 4, whereas when rubbing off was clearly observed, the ink was marked with x in the following table 4.

TABLE 4

|  | clogging | density | rubbing off |
|---|---|---|---|
| embodiment 1 | ○ | 1.17 | ○ |
| embodiment 2 | ○ | 1.18 | ○ |
| embodiment 3 | ○ | 1.12 | ○ |
| embodiment 4 | ○ | 1.14 | ○ |
| embodiment 5 | ○ | 1.09 | ○ |
| embodiment 6 | ○ | 1.10 | ○ |
| embodiment 7 | ○ | 1.25 | ○ |
| embodiment 8 | ○ | 1.28 | ○ |
| compara. ex 1 | x | 0.89 | x |
| compara. ex 2 | x | 0.87 | x |
| compara. ex 3 | x | 0.77 | x |
| compara. ex 4 | x | 0.79 | x |
| compara. ex 5 | x | 0.95 | ○ |
| compara. ex 6 | x | 0.92 | ○ |

As can be understood from table 4, since being excellent in dispersion, the stencil printing inks of the present invention did not cause clogging of the stencil, were good in printing density and were high in resistance to rubbing.

As can be understood from the description above, the stencil printing ink of the present invention is superior in dispersion of the smectite and stability of dispersion of the smectite to conventional stencil printing inks which do not contain polyamino-amide dispersant. Accordingly, the stencil printing ink of the present invention is easy to set its yield value to a desired value. Further since dispersion of the components such as the coloring agent is excellent, the quality of the image printed with the ink of the present invention is better than that printed with the conventional ink.

In addition, all of the contents of Japanese Patent Application No. 11(1999)-373676 are incorporated into this specification by reference.

What is claimed is:

1. A stencil printing ink comprising a polyamino-amide dispersant and a smectite.

2. A stencil printing ink as defined in claim 1 wherein the polyamino-amide compound is present in the stencil printing ink in an amount of 0.05 to 5% by weight of the total weight of the ink.

3. A stencil printing ink as defined in claim 1 in which the polyamino-amide dispersant comprises a polycarboxylate of polyamino-amide.

4. A stencil printing ink as defined in claim 1 in which the polyamino-amide dispersant comprises a salt of long-chain polyamino-amide and polar acid ester.

* * * * *